(12) United States Patent
Gaudin et al.

(10) Patent No.: US 8,555,102 B2
(45) Date of Patent: Oct. 8, 2013

(54) METHOD FOR MANAGING THE OPERATION OF A REMOTE INFORMATION SENSOR, AND ASSOCIATED SENSOR

(75) Inventors: Jean-Michel Gaudin, Rueil-Malmaison (FR); Patrick Weber, Rueil-Malmaison (FR)

(73) Assignee: Sagemcom Energy & Telecom SAS, Rueil-Malmaison (FR)

( * ) Notice: Subject to any disclaimer, the term of this patent is extended or adjusted under 35 U.S.C. 154(b) by 148 days.

(21) Appl. No.: 13/257,795

(22) PCT Filed: Mar. 25, 2010

(86) PCT No.: PCT/FR2010/050539
§ 371 (c)(1),
(2), (4) Date: Sep. 20, 2011

(87) PCT Pub. No.: WO2010/109139
PCT Pub. Date: Sep. 30, 2010

(65) Prior Publication Data
US 2012/0079309 A1 Mar. 29, 2012

(30) Foreign Application Priority Data
Mar. 27, 2009 (FR) ...................................... 09 01512

(51) Int. Cl.
*G06F 1/00* (2006.01)
(52) U.S. Cl.
USPC ............................................ 713/340; 702/61

(58) Field of Classification Search
USPC .................... 713/340, 300–330; 340/870.02; 702/61, 57–60
See application file for complete search history.

(56) References Cited

U.S. PATENT DOCUMENTS

2005/0222784 A1* 10/2005 Tuff et al. ........................ 702/61
2007/0051872 A1   3/2007 Goldberg et al.
2012/0194683 A1*  8/2012 Goldberg et al. ............. 348/160

FOREIGN PATENT DOCUMENTS

| EP | 0 420 295 B1 | 1/1994 |
| GB | 2 343 571 | 5/2000 |
| WO | WO 86/05024 | 9/1986 |

OTHER PUBLICATIONS

International Search Report as issued for PCT/FR2010/050539.

* cited by examiner

*Primary Examiner* — Clifford Knoll
(74) *Attorney, Agent, or Firm* — Pillsbury Winthrop Shaw Pittman, LLP

(57) ABSTRACT

A method for managing the operation of an information sensor for a meter, includes putting the sensor into a deep standby mode, in which a battery of the sensor does not supply electrical power in particular to a module for demodulating signals from the meter; connecting the sensor to the meter; detecting, using a detection module of the sensor, an information signal from the meter; removing the sensor from the deep standby mode in order to put same into an operative mode in which the battery supplies electrical power in particular to the demodulation module.

11 Claims, 2 Drawing Sheets

METHOD FOR MANAGING THE OPERATION OF A REMOTE INFORMATION SENSOR, AND ASSOCIATED SENSOR

CROSS REFERENCE TO RELATED APPLICATIONS

This application is the U.S. National Stage of PCT/FR2010/050539, filed Mar. 25, 2010, which in turn claims priority to French Patent Application No. 0901512, filed Mar. 27, 2009, the entire contents of all applications are incorporated herein by reference in their entireties.

TECHNICAL FIELD OF THE INVENTION

The object of the present invention is a method for managing the operation of a remote information sensor intended to be used with a meter, for example, but not only an electric meter type meter. The present invention also refers to a device of the remote information sensor type, able to implement the method according to the invention. The main object of the invention is to propose a remote information sensor, and management of the use of said sensor, that enables the autonomous lifetime, i.e., the lifetime without battery replacement, of the sensor under consideration to be extended. Remote information refers to any information that is available in the meter under consideration.

The field of the invention is, in general, that of meters intended to measure the consumption of an element such as water, gas, heat or else electricity. The present invention will be more particularly described in the case where the intervening meter is an electric meter type meter, but the object of the invention is applicable to all other types of meters—particularly gas, water and/or heat meters, particularly in the case where they issue a modulated signal. In this field, it is necessary to regularly collect data relative to the meter under consideration. This data may be in particular consumption reading values of the physical quantity at which the meter is associated, and/or information relative to the identification of the meter, and/or information relative to the proper operation of the meter, and/or else information relative to the securement of the meter, or any other type of information.

First, information relative to the meter or meters was manually collected by a specialized agent, or by a user who must send said information to the appropriate management company. Automating readings thus proves to be wise, and the use of electronic modules intervening as remote information sensors have thus been proposed. Such a sensor constitutes a data acquisition unit; It is intended to be connected to a meter under consideration, and is able to, in particular, extract information from said meter, store it and advantageously transmit it remotely, automatically or by following a prompt, for example by means of a radio module that it comprises.

TECHNOLOGICAL BACKGROUND OF THE INVENTION

Once installed and connected to the meter to which it is intended, the sensor is intended to remain in position for a very long time. Typically, the duration intended before its replacement is on the order of about fifteen years. For this purpose, the sensor under consideration thus incorporates a battery, most often in the form of a 3.6 volt battery. It is thus necessary to optimize the consumption of the energy resources that the battery constitutes; At present, the battery of the sensor is prompted from the time said sensor exits the production facility. In fact, once it exits from the facility, some electronic modules of the sensor are powered by the battery, particularly a module for demodulating information collected from the meter. And very often, between the exit from the production facility and the effective activation of the sensor under consideration, several years have elapsed. Thus, during these years, the sensor needlessly consumes its energy resource, which limits its lifetime by as much once it is activated by being connected to the meter to which it is intended.

GENERAL DESCRIPTION OF THE INVENTION

The method and sensor according to the invention propose a solution to the problem that has just been stated. In the invention, a solution is proposed so that the sensor battery is not used from the time it exits the production facility, at least is not significantly used by needlessly powering some electronic modules of said sensor. For this purpose, the definition of a particular standby mode, called deep standby mode, is provided in the invention, in which the sensor under consideration is put from the time it exits the production facility. The deep standby mode is maintained until the sensor is connected to a meter, and until the meter transmits to the sensor an appropriate signal, called the deep standby exit signal. Advantageously, in certain cases, the sensor may, after having been connected to a meter, again be put in the deep standby mode.

The invention thus mainly relates to a method for managing the operation of an information sensor for a meter, particularly of the electric meter type, characterized in that the method comprises different steps consisting of:

putting the sensor into a deep standby mode, in which a battery of said sensor does not supply electrical power in particular to a module for demodulating signals from said meter;

connecting the sensor to the meter;

detecting, by means of a sensor detection module, an information signal from the meter;

removing the sensor from the deep standby mode to put it in an active mode in which the battery supplies electrical power in particular to the demodulation module.

The method according to the invention may comprise, in addition to the main characteristics that have just been mentioned in the previous paragraph, one or more additional characteristics from among the following:

the step consisting of removing the sensor from the deep standby mode comprises various operations consisting of:

transforming, within the detection module, the information signal into an asynchronous interruption signal transmitted to a microcontroller of the sensor;

activating the microcontroller particularly by activating an inner clock of the microcontroller;

transmitting from the microcontroller to a switch device a control signal causing a transition between a blocked mode, in which the switch device does not allow an electric signal to pass between the battery and the demodulation module, and an on mode, in which the switch device allows an electric signal to pass between the battery and the demodulation module.

the method comprises the additional step consisting of, in the absence of a control signal, switching the sensor from active mode to deep standby mode.

the method comprises the additional step consisting of, prior to the step of switching the sensor from the active mode to the deep standby mode, storing information transmitted by the meter to the sensor in a memory module.

The different additional characteristics of the method according to the invention, insofar as they are not mutually exclusive, are combined according to all combination possibilities to result in different examples of embodiment of the invention.

The present invention also refers to a sensor able to intervene in the method according to at least one of the previous claims, said sensor comprising in particular:
a microcontroller;
an electric power supply battery;
a module for demodulating signals received from a meter, particularly an electric meter, connected to said sensor; characterized in that said sensor comprises:
a detection module for detecting the transmission from the meter to the sensor of an information signal;
a switch device to block the electric power supply from the demodulation module as long as no information signal was detected by the detection module, and to ensure the electric power supply of the demodulation module when an information signal was detected by the detection module.

The sensor according to the invention may comprise, in addition to the main characteristics that have just been mentioned in the previous paragraph, one or more additional characteristics from among the following:
the detection module comprises a peak detector circuit.
the peak detector circuit is of the voltage tripler circuit type.
the detection module comprises an input resistor with a value of between 1 kilo-ohm and 10 kilo-ohms, particularly 4.7 kilo-ohms.
the detection module comprises a means to generate an asynchronous interruption signal when a remote information signal is received by said sensor.
the switch device comprises a MOSFET type transistor that is on during the transmission of a control signal, transmitted by the microcontroller, on the gate of said transistor.

The different additional characteristics of the sensor according to the invention, insofar as they are not mutually exclusive, are combined according to all combination possibilities to result in different examples of embodiment of the invention.

The invention and its various applications will be better understood upon reading the following description and examining the accompanying figures.

BRIEF DESCRIPTION OF THE FIGURES

The figures are only presented for indicative purposes and in no way limit the scope of the object of the present invention. The figures show.

DESCRIPTION OF PREFERRED FORMS OF EMBODIMENT OF THE INVENTION

Unless stated otherwise, different elements appearing in different figures will keep the same references.

Figure 1:
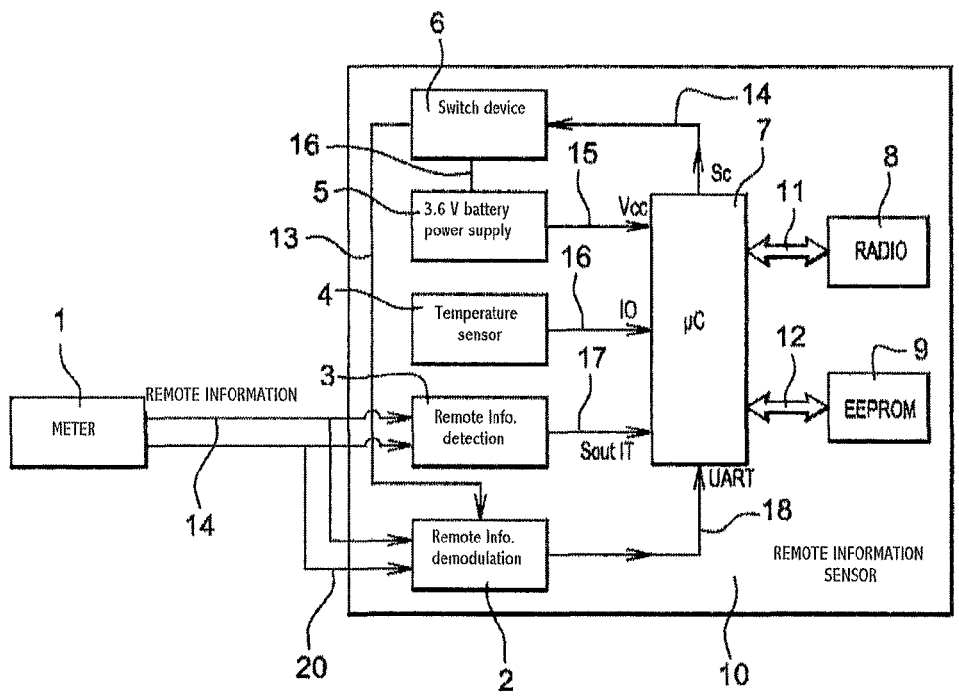
FIG. 1 represents a schematic representation of the remote information sensor according to the invention.

FIG. 1 represents an example of a remote information sensor 10. Remote information, also called information, is issued from a meter 1, particularly an electric meter.

In the example represented, sensor 10 comprises the following elements:
a microcontroller 7;
an EEPROM type memory module 9, able to exchange information with the microcontroller 7 through a connection 12;
a radio module 8, able to exchange information with the microcontroller 7 through a connection 11; the radio module 8 enables information received from meter 1 to be transmitted to a residential gateway, for example a remote server, by the airway;
a module 2 for demodulating information transmitted by meter 1; the demodulation module 2 is connected to the microcontroller 7 by a connection 18; connection 18 is connected to a UART (Universal Asynchronous Receiver Transmitter) port of the microcontroller 7; the function of the demodulator 2 is to demodulate information transmitted by the meter to transform it into signals compatible with the microcontroller 7;
a switch device 6, connected by a first connection 13 to demodulation module 2; in addition, the switch device is connected to the microcontroller 7 by a connection 14;
a battery 5, for example a 3.6 volt battery; battery 5 is connected on the one hand to a VCC port of microcontroller 7 by a connection 15, and on the other hand to the switch device 6 by a connection 16;
a temperature sensor 4, connected to an I/O input port of microcontroller 7 through a connection 16;
a module 3 for detecting the arrival of information transmitted by meter 1, connected by a connection 17 to an IT port, managing the interruptions, of the microcontroller 7.

Meter 1 is connected to the remote information sensor 10 by a first connection 19 connected to detection module 3 and by a second connection 20 connected to demodulation module 2.

Figure 2:
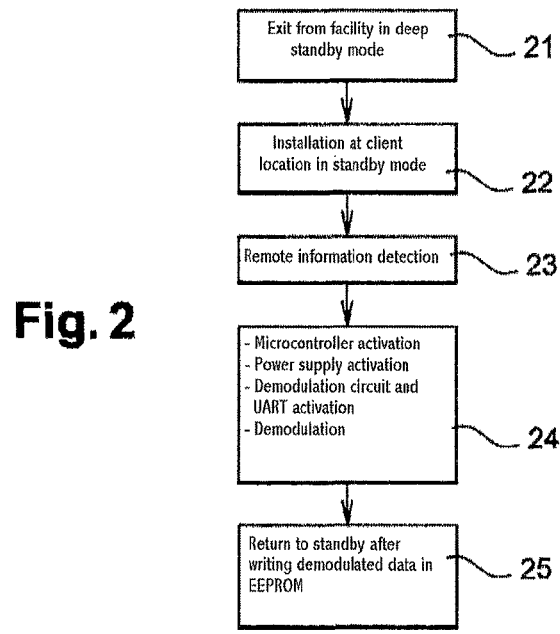
FIG. 2 represents a flow chart illustrating an example of implementation of the method according to the invention.

An example of a possible implementation of the method according to the invention is illustrated by means of the flow chart in FIG. 2.

In this figure, a first step 21 consists of putting, for example from the time the sensor exits the production facility, the sensor 10 in a particular mode, known as the deep standby mode. Deep standby mode is a state in which battery 5 does not supply electrical power to the various elements of sensor 10 that have just been described. Advantageously, here only microcontroller 7 is powered at the level of its VCC supply port via connection 15; Such a power supply is advantageous for managing for example asynchronous interruption signals likely to be received by microcontroller 7. Thus, the clock of microcontroller 7 is not activated, and the demodulation module 2 does not consume energy.

A second step 22 consists of the installation at a user location of sensor 10. The installation involves the connection of sensor 10 on meter 1 through connection 19 and connection 20.

A following step 23 is a step of detecting by sensor 10, and more precisely by the detection module 3, a remote information signal transmitted by meter 1. When such a signal is detected, the detection module 3 transmits over connection 17 an asynchronous interruption signal received at the level of the IT port of the microcontroller 7.

The detection device 3 is advantageously an energy detector; it may for example use the energy of the signal received from the meter to become active and generate the interruption signal; Any other type of energy detector may be used in the sensor according to the invention.

From the receipt by microcontroller 7 of the asynchronous interruption signal, in a following step 24, microcontroller 7 is activated by activating the inner clock of the microcontroller. A control signal Sc is then transmitted by microcontroller 7 via connection 14 to switch the switch device 6, and to turn it on such that the power supply of various modules, and particularly demodulation module 2, is effective. Exchanges between demodulation module 2 and the UART port of microcontroller 7 may then take place.

In a particular mode of implementation of the invention, a following step 25 is provided in which the sensor 10 returns to deep standby mode. Previously, the data received by sensor 10 is stored in the memory module 9. Such a step is advantageous and does not disrupt at all the utilization of information received from meter 1, said information being transmitted promptly and not continuously. Passing into deep standby mode is carried out by the transmission of a new control signal from microcontroller 7 to switch device 6, or by the interruption of the control signal Sc, turning the transistor under consideration off.

Figure 3:
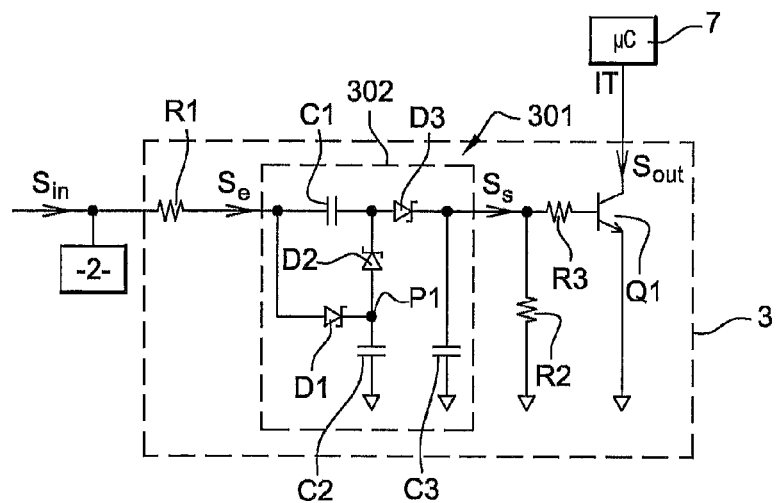
FIG. 3 represents an example of an electronic circuit able to be used in the sensor according to the invention to detect a signal able to remove said sensor from a deep standby mode.

FIG. 3 illustrates an example of embodiment of detection module 3. FIG. 3 is described together with FIG. 4, that represents different signals observed in the detection module.

Thus, FIG. 3 shows an electronic circuit 301 that particularly respects the following constraints:

A dynamic range from 800 mV to 5 V peak (differential voltage between two wires constituting the connection 19 of a remote information signal Sin; thus, any input signal greater than 800 mV must cause removal from deep standby mode, by being interpreted as information from meter 1 and cause in fine the activation of battery 5 by closing the switch device 6; conversely, an input signal less than 300 mV must not cause removal from deep standby mode;

Circuit 301 does not generate non-linearity given the input of sensor 10, by not causing input impedance discontinuity whatever the operation conditions of said circuit 301.

Figure 4:
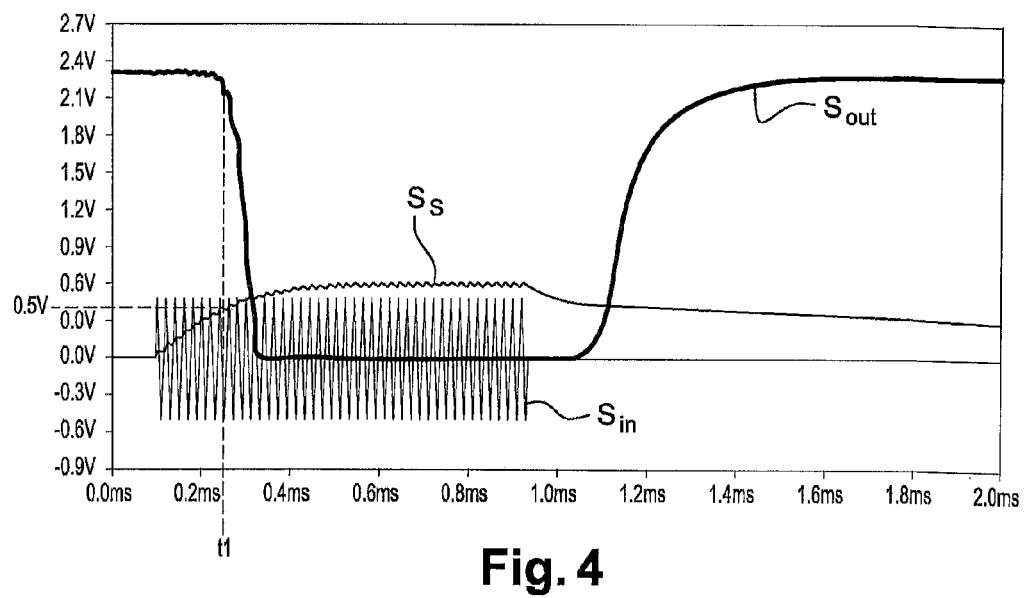
FIG. 4 represents a timing chart illustrating the evolution of different signals in the electronic circuit of FIG. 3 during an example of implementation of the method according to the invention.

The remote information signal Sin is transmitted by meter 1. It is also received by demodulation module 2. The remote information signal Sin enters the detection module 3 by traversing an input resistor R1, of high value, for example 4.7 KOhms, that enables the non-linear effects caused by the conduction of diodes present in circuit 301 to be minimized, such that from the point of view of the input of demodulation module 3, the impedance remains linear whatever the conditions. As seen in FIG. 4, the remote information signal Sin is a sinusoidal signal presenting a peak-to-peak amplitude on the order of 800 mV; According to the standard in force, remote information signals transmitted by meter 1 are 8-bit signals, each bit corresponding to a Sin signal of the type as that represented, i.e., an ASK modulated signal with a frequency equal to 50 Hz, and a duration of 833 microseconds.

In practice, the signal actually received by detection module 2 is a slightly attenuated signal, due to the parallel transmission to the demodulation module 3 of the signal Sin.

After having traversed the resistor R1, the signal traverses a peak detector circuit 302. In the example represented, the peak detector circuit is of the voltage tripler type. In the example under consideration, the voltage tripler presents the following structure:

The signal flowing in detection module 3 successively encounters:
disposed in parallel, on the one hand a first capacitor C1, for example with a value of 1.2 nF (nanofarad) and on the other hand a first diode D1 and a second diode D2; a second capacitor C2, for example with a value of 1.2 nF, is disposed between the circuit mass 301 and a connection point P1 disposed between the first diode D1 and the second diode D2;
disposed in parallel, a third capacitor C3, for example with a value of 1 nF.

The orientation of the three diodes is such that during a first positive half-wave of the signal Se for input into the voltage tripler, diode D1 is blocked and the first capacitor C1 is charged to the value Vc, which corresponds to the peak voltage of the signal Se; during the first negative half-wave of the input signal, diode D1 is on, and the second capacitor C2 is charged to the value 2Vc; During the second positive half-wave of the input signal, diodes D2 and D3 are on, and the third capacitor C3 is charged to the value 3Vc.

One thus obtains, on exit from voltage tripler 302, a continuous output signal Ss represented in FIG. 4, that approaches a value substantially equal to three times the input voltage Se of said voltage tripler 302.

A second resistor R2, for example with a value of 1000 kilo-ohms, is disposed in parallel in output from voltage tripler 302; This resistor is used for discharging the capacitor C3 when the signal Sin is no longer provided for input into detection circuit 3.

Signal Se then encounters a third resistor R3, for example with a value of 47 kilo-ohms, the function of which is to reduce the value of the intensity of the flowing current, and arriving on the basis of a bipolar transistor Q1. As illustrated in FIG. 4, when the intensity of the output signal from voltage tripler 302 is sufficient, which is produced at a time t1 in the example under consideration, or for a peak-to-peak voltage of approximately 1 volt for 30 Ss, transistor Q1 turns on and an output voltage Sout of the circuit 301, measured at the level of the transistor Q1 collector, reduces. The collector is in addition connected to the IT port of microcontroller 7, while the transmitter is connected to the circuit mass 301. Transmission to the detection circuit 3 of the remote information signal Sin thus results in the detection at the level of the IT port of an asynchronous interruption signal, resulting in the passage of a high signal to a low signal. Microcontroller 7 then passes into active mode, activates its clock, and produces the control signal Sc that is received by the switch device 6.

Thus, the proposed implementation for the circuit 301 is based on detecting a voltage tripler-based remote information signal Sin envelope enabling sufficient energy to be detected considering the dynamic range of the input signal under small signal conditions to cause the conduction of a bipolar transistor. The implementation proposed enables a reaction time of less than 800 microseconds to be obtained, whatever the usual ambient temperature conditions observed.

Figure 5:
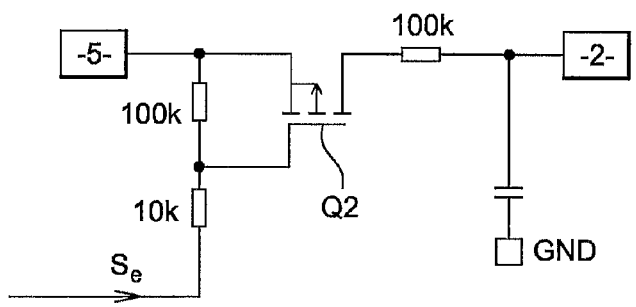
FIG. 5 represents an electronic circuit able to be used in the sensor according to the invention to ensure the electric power supply of some modules of said sensor once said sensor is removed from deep standby mode.

As illustrated in FIG. 5, the signal Sc is transmitted on the gate of a MOSFET type P Q2 transistor, whose source is connected to battery 5 and whose drain is connected to demodulation module 2. Thus, when a control signal Sc is transmitted by microcontroller 7, the transistor may pass from a blocked state to an on state, thus enabling the electric power supply of demodulation module 2; Conversely, the disappearance of the signal Sc blocks transistor Q2, and returns the sensor to the deep standby mode.

The invention claimed is:

1. A method for managing the operation of an information sensor for a meter, the method comprising:
   putting the sensor into a deep standby mode, in which a battery of said sensor does not supply electrical power to a module configured to demodulate signals from said meter;
   connecting the sensor to the meter;
   detecting, using a sensor detection module, an information signal from the meter;
   removing the sensor from the deep standby mode to put the sensor in an active mode in which the battery supplies electrical power to the demodulation module.

2. The method according to claim 1, wherein removing the sensor from deep standby mode comprises:
   transforming, within the detection module, the information signal into an asynchronous interruption signal transmitted to a microcontroller of the sensor;
   activating the microcontroller by activating an inner clock of the microcontroller;
   transmitting from the microcontroller to a switch device a control signal causing a transition between a blocked mode, in which the switch device does not allow an electric signal to pass between the battery and the demodulation module, and an on mode, in which the switch device allows an electric signal to pass between the battery and the demodulation module.

3. The method according to claim 2, wherein, in the absence of a control signal, the method comprises switching the sensor from active mode to deep standby mode.

4. The method according to claim 3, wherein, prior to switching the sensor from active mode to deep standby mode, the method comprises storing the information transmitted by the meter to the sensor in a memory module.

5. A sensor for use in the method according to claim 1, said sensor comprising:
   a microcontroller;
   an electric power supply battery;
   a module configured to demodulate signals received from a meter connected to said sensor;
   a detection module configured to detect the transmission from meter to sensor of an information signal;
   a switch device configured to block the electric power supply from the demodulation module as long as no information signal was detected by the detection module, and to ensure the electric power supply of the demodulation module when an information signal was detected by the detection module.

6. The sensor according to claim 5, wherein the detection module comprises a peak detector circuit.

7. The sensor according to claim 6, wherein the peak detector circuit is of the voltage tripler circuit type.

8. The sensor according to claim 5, wherein the detection module comprises an input resistor with a value of between 1 kilo-ohm and 10 kilo-ohms.

9. The sensor according to claim 5, wherein the switch device comprises a MOSFET type transistor that is on during transmission of a control signal, transmitted by the microcontroller, on the gate of said transistor.

10. The sensor according to claim 6, wherein the detection module comprises a signal generator to generate an asynchronous interruption signal when an information signal is received by said sensor.

11. The sensor according to claim 8, wherein the value is 4.7 kilo-ohms.

* * * * *